United States Patent
Ahn et al.

(10) Patent No.: US 9,507,209 B2
(45) Date of Patent: Nov. 29, 2016

(54) LIQUID CRYSTAL DISPLAY DEVICE AND METHOD FOR MANUFACTURING THE SAME

(71) Applicant: SAMSUNG DISPLAY CO., LTD., Yongin, Gyeonggi-Do (KR)

(72) Inventors: Hyunku Ahn, Gyeonggi-do (KR); Ho Lim, Gyeonggi-do (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 0 days.

(21) Appl. No.: 14/613,844

(22) Filed: Feb. 4, 2015

(65) Prior Publication Data
US 2015/0362803 A1 Dec. 17, 2015

(30) Foreign Application Priority Data
Jun. 11, 2014 (KR) .................. 10-2014-0070826

(51) Int. Cl.
| | |
|---|---|
| *B05D 3/00* | (2006.01) |
| *G02F 1/1337* | (2006.01) |
| *C09K 19/56* | (2006.01) |
| *C09K 19/14* | (2006.01) |
| *C09K 19/04* | (2006.01) |
| *C09K 19/12* | (2006.01) |
| *C09K 19/20* | (2006.01) |

(52) U.S. Cl.
CPC ......... *G02F 1/133711* (2013.01); *C09K 19/14* (2013.01); *C09K 19/56* (2013.01); *G02F 1/133703* (2013.01); *C09K 2019/0448* (2013.01); *C09K 2019/122* (2013.01); *C09K 2019/2042* (2013.01); *G02F 2001/133726* (2013.01)

(58) Field of Classification Search
CPC ............ G02F 1/13378; G02F 1/133788; G02F 1/133711; G02F 1/1339; G02F 1/13439; G02F 1/133703; G02F 2001/133726; C09K 19/56; C09K 2019/0448; C09K 2019/122; C09K 2019/2042; Y10T 428/10; Y10T 428/1005; Y10T 428/1023
USPC ......... 428/1.1, 1.2, 1.26; 349/123, 127, 129; 427/162, 532, 551, 553, 558; 445/25
See application file for complete search history.

(56) References Cited

U.S. PATENT DOCUMENTS

| | | | |
|---|---|---|---|
| 6,201,588 | B1 | 3/2001 | Walton et al. |
| 6,885,423 | B2 | 4/2005 | Shuto et al. |
| 7,105,209 | B2 | 9/2006 | Heckmeier et al. |
| 8,409,674 | B2 | 4/2013 | Harding et al. |

(Continued)

FOREIGN PATENT DOCUMENTS

| | | |
|---|---|---|
| KR | 1020100047570 | 5/2010 |
| KR | 1020110113621 | 10/2011 |
| KR | 1020120088010 | 8/2012 |
| KR | 1020120125141 | 11/2012 |

*Primary Examiner* — Ruiyun Zhang
(74) *Attorney, Agent, or Firm* — F. Chau & Associates, LLC

(57) ABSTRACT

Provided is a method of manufacturing a liquid crystal display device including disposing an alignment solution including an alignment agent, reactive mesogens and a solvent on at least one of a first substrate or a second substrate. The alignment solution is cured to form a main alignment layer. A liquid crystal layer is disposed between the first substrate and the second substrate. The main alignment layer and the liquid crystal layer are heated to elute the reactive mesogens into the liquid crystal layer. The liquid crystal layer is exposed to light to react the reactive mesogens.

19 Claims, 5 Drawing Sheets

(56) References Cited

U.S. PATENT DOCUMENTS

| | | |
|---|---|---|
| 2002/0036739 A1 | 3/2002 | Shuto et al. |
| 2005/0179003 A1 | 8/2005 | Heckmeier et al. |
| 2008/0160222 A1 | 7/2008 | Harding et al. |
| 2011/0025967 A1* | 2/2011 | Sohn ................ G02F 1/133711 349/124 |
| 2012/0229744 A1* | 9/2012 | Hattori ..................... C08F 2/50 349/124 |

* cited by examiner

LIQUID CRYSTAL DISPLAY DEVICE AND METHOD FOR MANUFACTURING THE SAME

CROSS-REFERENCE TO RELATED APPLICATION

This U.S. non-provisional patent application claims priority under 35 U.S.C. §119 to Korean Patent Application No. 10-2014-0070826, filed on Jun. 11, 2014, the disclosure of which is incorporated by reference herein in its entirety.

TECHNICAL FIELD

Exemplary embodiments of the present inventive concept relate to a liquid crystal display, and more particularly to a liquid crystal display device and a method for manufacturing the liquid crystal display device.

DISCUSSION OF RELATED ART

Examples of liquid crystal display devices include a twisted nematic mode liquid crystal display device, an in-plane switching mode liquid crystal display device, and a vertical alignment mode liquid crystal display device.

In the vertical alignment mode liquid crystal device, liquid crystal molecules may be aligned in a certain direction when an electric field is not applied, and a longitudinal axis of the liquid crystal molecules may be vertically aligned with respect to a substrate. Viewing angles of the liquid crystal display device may be relatively wide, and a contrast ratio may be relatively high.

Methods for aligning the liquid crystal molecules in a certain direction may include a rubbing method or a photo-alignment method. In the vertical alignment mode of the liquid crystal display device, the liquid crystal molecules may be aligned in a certain direction by using reactive mesogens.

SUMMARY

Exemplary embodiments of the present inventive concept provide a liquid crystal display device having high reliability.

Exemplary embodiments of the present inventive concept provide a method for manufacturing a liquid crystal display device having high reliability.

Exemplary embodiments of the present inventive concept provide methods for manufacturing a liquid crystal display device including disposing an alignment solution including an alignment agent, reactive mesogens and a solvent on at least one of a first substrate or a second substrate. The alignment solution is cured to form a main alignment layer. A liquid crystal layer is disposed between the first substrate and the second substrate. The main alignment layer and the liquid crystal layer are heated to elute the reactive mesogens into the liquid crystal layer. The liquid crystal layer is exposed to light to react the reactive mesogens.

The reactive mesogen may include at least one compound represented by Formula 1.

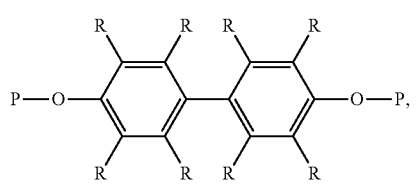
[Formula 1]

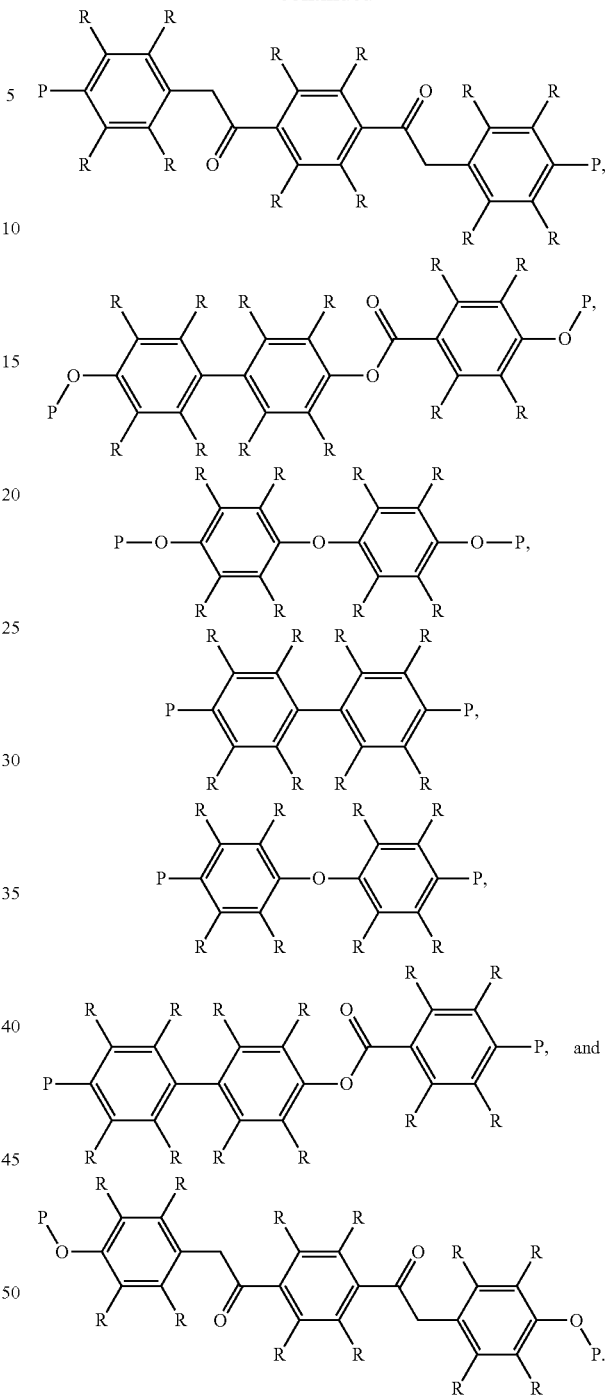

Each of P may be a compound represented by Formula 2,

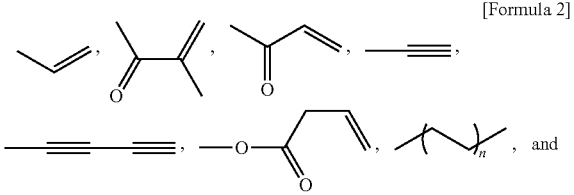
[Formula 2]

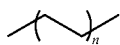

Each of R may be of —Cl, —F, —Br, —I, —H, —NO$_2$, —(CH$_2$)$_n$CH$_3$, or —O—(CH$_2$)$_n$CH$_3$, the reactive mesogens including two groups of

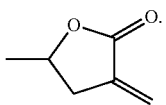

as P, and n may be an integer from 0 to 20.

The reactive mesogens may be about 0.1 parts by weight to about 10 parts by weight based on 100 parts by weight of the alignment agent.

The reactive mesogens may be a compound represented by Formula 3 or formula 4.

[Formula 3]

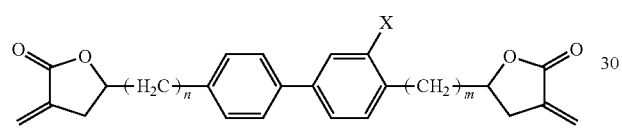

[Formula 4]

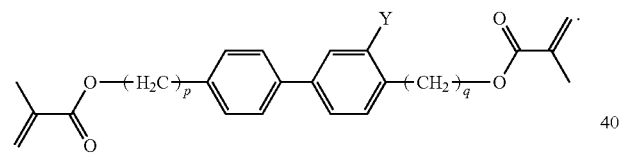

Each of X and Y may be —F, —H or an alkyl group or an alkoxy group having 1 to 4 carbon atoms, and n, m, p, and q may each be an integer from 0 to 3.

Disposing of the liquid crystal layer between the first substrate and the second substrate may include disposing liquid crystals on at least one of the first substrate and the second substrate. A sealant solution may be disposed along an edge of at least one of the first substrate and the second substrate. The first substrate and the second substrate may be disposed to face to each other with the liquid crystals therebetween. The sealant solution may be cured.

Eluting the reactive mesogens into the liquid crystal layer and curing the sealant solution may be performed in a single step.

Curing the alignment solution may include pre-curing the alignment solution at a first temperature, and main-curing the alignment solution at a second temperature higher than the first temperature.

The alignment agent may include at least diamine represented by Formula 5 and at least one dianhydride represented by Formula 6.

[Formula 5]

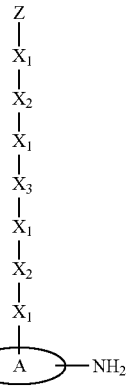

[Formula 6]

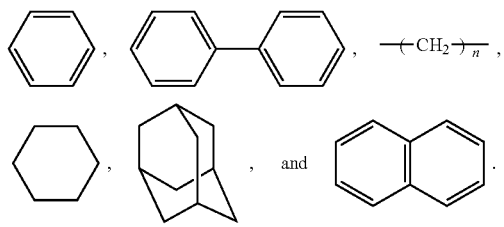

A may be a compound represented by Formula 7, and n may be an integer from 1 to 20,

[Formula 7]

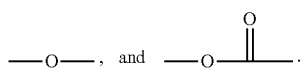

$X_1$ may be a compound represented by Formula 8,

[Formula 8]

—O—, and —O—C(=O)—.

$X_2$ may be a compound represented by Formula 9,

[Formula 9]

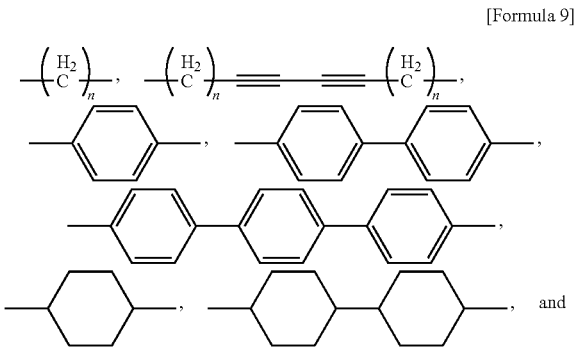

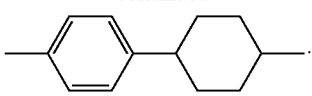

$X_3$ may be a compound represented by Formula 10,

[Formula 10]

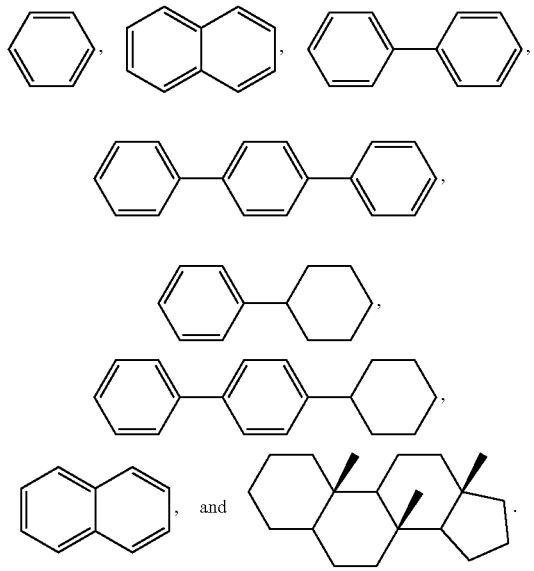

Z may be a compound represented by Formulae 11 or 12,

[Formula 11]

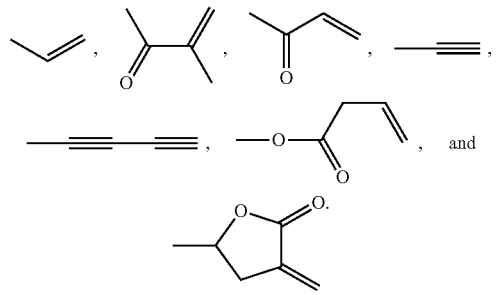

[Formula 12]

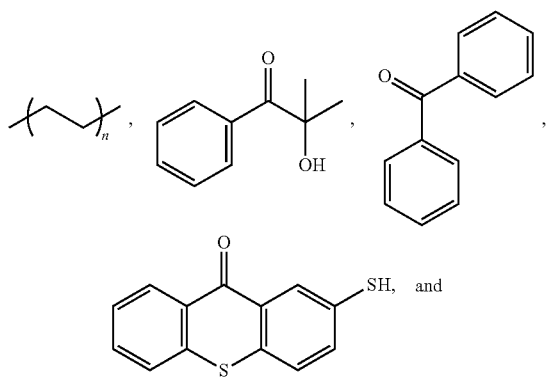

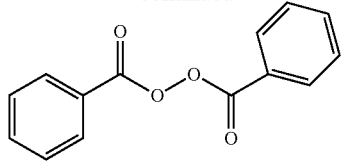

B may be a compound represented by Formula 13,

[Formula 13]

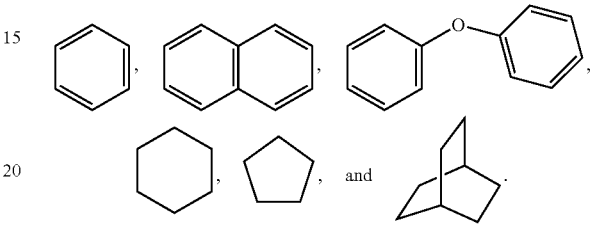

In exemplary embodiments of the present inventive concept, liquid crystal display devices may be manufactured by the above-described methods. The liquid crystal display devices include a first substrate and a first alignment layer disposed on the first substrate. A second substrate faces the first substrate. A second alignment layer is disposed on the second substrate. A liquid crystal layer is disposed between the first substrate and the second substrate. The liquid crystal layer includes liquid crystal molecules. Each of the first alignment layer and the second alignment layer includes a main alignment layer and an alignment forming layer disposed on the main alignment layer. The alignment forming layer includes a polymer including at least one compound represented by Formula 1.

In the liquid crystal display device according to an exemplary embodiment of the present inventive concept, a pretilt angle may be formed, and defects such as black afterimage, surface afterimage, and instant afterimage may be decreased. Reliability of the liquid crystal display device may be increased.

BRIEF DESCRIPTION OF THE DRAWINGS

The above and other features of the present inventive concept will become more apparent by describing in detail exemplary embodiments thereof, with reference to the accompanying drawings in which.

DETAILED DESCRIPTION OF THE EMBODIMENTS

Figure 1:
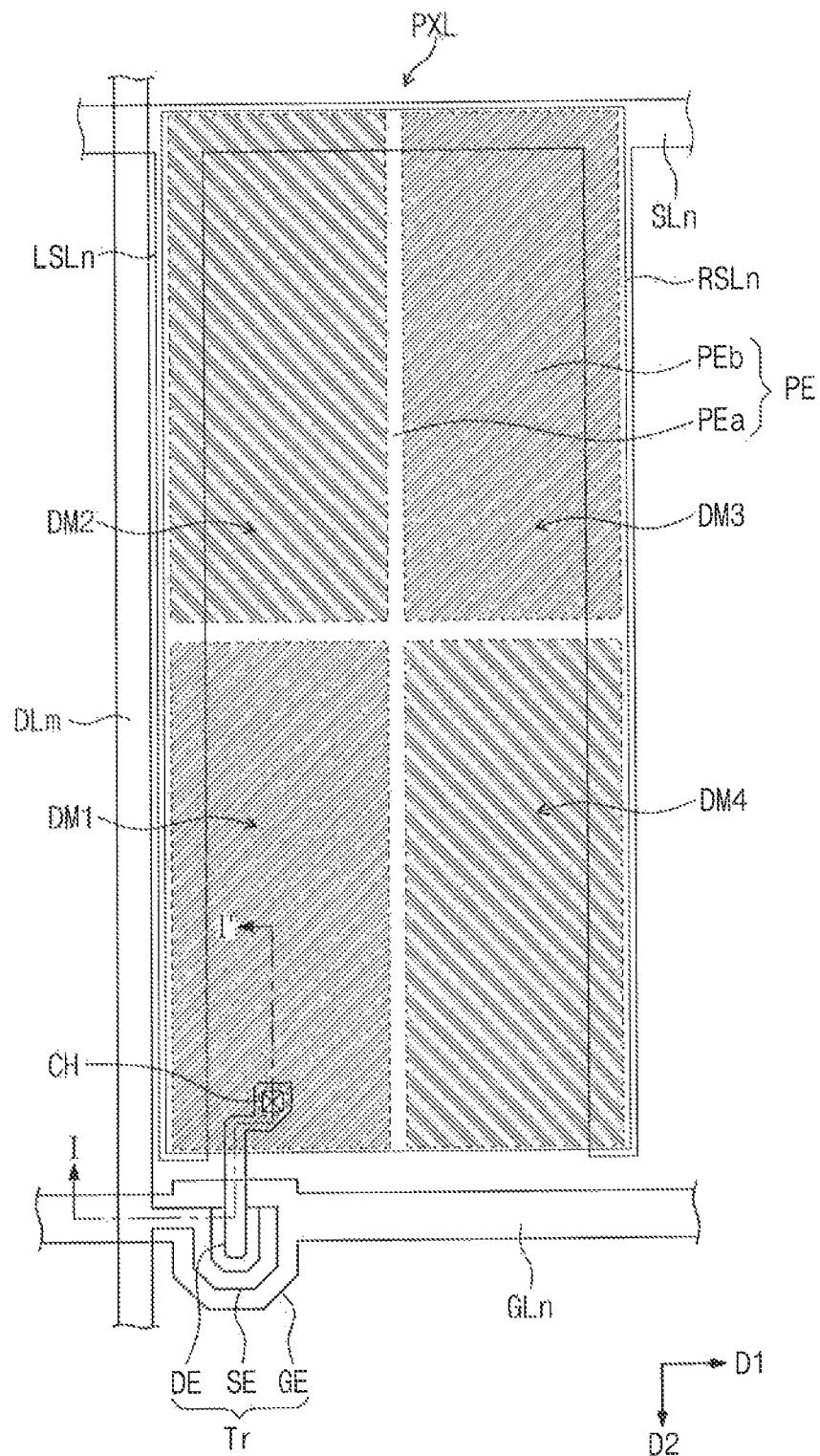
FIG. 1 is a plan view of a liquid crystal display device including a plurality of pixels according to an exemplary embodiment of the present inventive concept.

Exemplary embodiments of the present inventive concept will be described below in more detail with reference to the accompanying drawings. Exemplary embodiments of the present inventive concept may, however, be embodied in different forms and should not be construed as limited to the embodiments set forth herein.

Like reference numerals may refer to like elements throughout the specification and drawings. The dimensions of layers and regions may be exaggerated for clarity.

Hereinafter, exemplary embodiments of the present inventive concept will be described in more detail with reference to the accompanying drawings.

Figure 2:
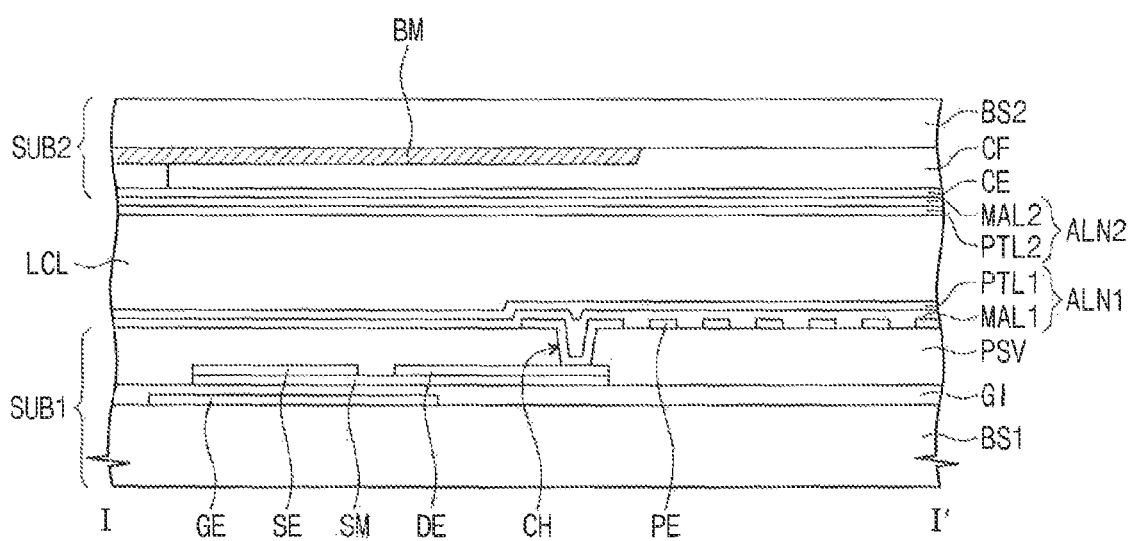
FIG. 2 is a cross-sectional view of the liquid crystal display device taken along line I-I' in FIG. 1.

FIG. 1 is a plan view of a liquid crystal display device including a plurality of pixels according to an exemplary embodiment of the present inventive concept. FIG. 2 is a cross-sectional view of the liquid crystal display device taken along line I-I' in FIG. 1. In an exemplary embodiment of the present inventive concept, each of the pixels PXL may have a same structure, and for convenience of explanation, only one pixel PXL is illustrated, and the pixel PXL is illustrated along with an adjacent gate line and data line.

Referring to FIGS. 1 and 2, the liquid crystal display device may include a first substrate SUB1, a first alignment layer ALN1 disposed on the first substrate SUB1, a second substrate SUB2 facing the first substrate SUB1, a second alignment layer ALN2 disposed on the second substrate SUB2, and a liquid crystal layer LCL disposed between the first substrate SUB1 and the second substrate SUB2.

The first substrate SUB1 may include a first base substrate BS1, a plurality of gate lines GLn, a plurality of data lines DLm, and a plurality of pixels PXL. The first base substrate BS1 may have an approximately square shape and may include a transparent insulating material.

For convenience of explanation, one pixel PXL along with an n-th gate line GLn of the plurality of gate lines and an m-th data line DLm of the plurality of data lines is illustrated in FIGS. 1 and 2. In the liquid crystal display device according to an exemplary embodiment of the present inventive concept, remaining pixels PXL of the plurality of pixels may have a similar structure, and hereinafter, the n-th gate line GLn and the m-th data line DLm may be referred to as the gate line GLn and the data line DLm, respectively.

The gate line GLn may extend in a first direction D1 and may be disposed on the first base substrate BS1. The data line DLm may extend in a second direction D2 which crosses the first direction D1 and may be separately disposed from the gate line GLn with a gate insulating layer GI therebetween. The gate insulating layer GI may be disposed on substantially an entire surface of the first base substrate BS1 and may cover the gate line GLn.

Each pixel PXL may be connected to the corresponding gate line GLn of the plurality of gate lines GLn and the corresponding data line DLm of the plurality of data lines DLm. Each pixel PXL may include a thin film transistor Tr, a pixel electrode PE connected to the thin film transistor Tr, and a storage electrode part. The thin film transistor Tr may include a gate electrode GE, a gate insulating layer GI, a semiconductor pattern SM, a source electrode SE and a drain electrode DE. The storage electrode part may include a storage line SLn extended in the first direction D1, and first and second branch electrodes LSLn and RSLn branched from the storage line SLn and extended in the second direction D2.

The gate electrode GE may protrude from the gate line GLn or may be disposed on a portion of the gate line GLn.

The gate electrode GE may include a metal. The gate electrode GE may include, for example, nickel, chromium, molybdenum, aluminum, titanium, copper, tungsten, or an alloy including the preceding metals. The gate electrode GE may be a single layer or a multi layer including the metal. For example, the gate electrode GE may be a triple layer obtained by sequentially stacking molybdenum, aluminum and molybdenum, or a double layer obtained by sequentially stacking titanium and copper. The gate electrode GE may be a single layer including an alloy of titanium and copper.

The semiconductor pattern SM may be disposed on the gate insulating layer GI. The semiconductor pattern SM may be disposed on the gate electrode GE with the gate insulating layer GI therebetween. The semiconductor pattern SM may partially overlap with the gate electrode GE. The semiconductor pattern SM may include an active pattern (not shown) disposed on the gate insulating layer GI and an ohmic contact layer (not shown) disposed on the active pattern. The active pattern may include an amorphous silicon thin film, and the ohmic contact layer may include an n+ amorphous silicon thin film. The ohmic contact layer may make ohmic contact between the active pattern, the source electrode SE and the drain electrode DE.

The source electrode SE may be branched from the data line DLm. The source electrode SE may be disposed on the ohmic contact layer and may partially overlap with the gate electrode GE.

The drain electrode DE may be separately disposed from the source electrode SE with the semiconductor pattern SM disposed therebetween. The drain electrode DE may be disposed on the ohmic contact layer and may partially overlap with the gate electrode GE.

The source electrode SE and the drain electrode DE may include nickel, chromium, molybdenum, aluminum, titanium, copper, tungsten, or an alloy of the preceding metals. The source electrode SE and the drain electrode DE may be a single layer or a multi layer including the metal. For example, the source electrode SE and the drain electrode DE may be a double layer obtained by sequentially stacking titanium and copper or a single layer including an alloy of titanium and copper.

A top surface of the active pattern between the source electrode SE and the drain electrode DE may be exposed, and may become a channel part forming a conductive channel between the source electrode SE and the drain electrode DE according to the application of a voltage into the gate electrode GE. The source electrode SE and the drain electrode DE may partially overlap the semiconductor layer SM excluding the channel part where the source electrode SE and the drain electrode DE are separately disposed.

The pixel electrode PE may be connected to the drain electrode DE with a passivation layer PSV disposed therebetween. The pixel electrode PE may partially overlap the storage line SLn, and the first and second branch electrodes LSLn and RSLn to form a storage capacitor.

The passivation layer PSV may cover the source electrode SE, the drain electrode DE, the channel part, and the gate insulating layer GI, and may include a contact hole CH partially exposing the drain electrode DE. The passivation layer PSV may include, for example, silicon nitride or silicon oxide.

The pixel electrode PE may be connected to the drain electrode DE through the contact hole CH disposed in the passivation layer PSV.

The pixel electrode PE may include a stem part PEa and a plurality of branch parts PEb radially protruding from the stem part PEa. The stem part PEa or a portion of the branch parts PEb may be connected to the drain electrode DE through the contact hole CH.

The stem part PEa may have various shapes, for example, a cross shape according to an exemplary embodiment of the present inventive concept. The pixel PXL may be divided into a plurality of domains by the stem part PEa, and the branch parts PEb may extend in different directions from each domain. According to an exemplary embodiment of the present inventive concept, the pixel PXL including first to fourth domains DM1, DM2, DM3 and DM4 is illustrated. The plurality of the branch parts PEb may be separated so that adjacent branch parts PEb do not cross each other, and in the divided region by the stem part PEa, the branch parts PEb may be parallel to each other.

In the branch parts PEb, adjacent branch parts PEb may be separated by a micrometer unit so as to align liquid crystal molecules LC in the liquid crystal layer LCL to a certain azimuth angle on a plane parallel to the first or second base substrates BS1 or BS2.

The pixel electrode PE may include a transparent conductive material. For example, the pixel electrode PE may include a transparent conductive oxide. The transparent conductive oxide may include indium tin oxide (ITO), indium zinc oxide (IZO), or indium tin zinc oxide (ITZO).

The first alignment layer ALN1 may be disposed on the first substrate SUB1. The first alignment layer ALN1 may include a first main alignment layer MAL1 and a first alignment forming layer PTL. The first main alignment layer MAL1 may be disposed on the passivation layer PSV and may cover the pixel electrode PE. On the first main alignment layer MAL1, the first alignment forming layer PTL1 may be disposed.

The first alignment forming layer PTL1 may include a polymer obtained by the polymerization of the reactive mesogens. In an exemplary embodiment of the present inventive concept, the reactive mesogens may include one or more of the compounds represented by Formula 1.

[Formula 1]

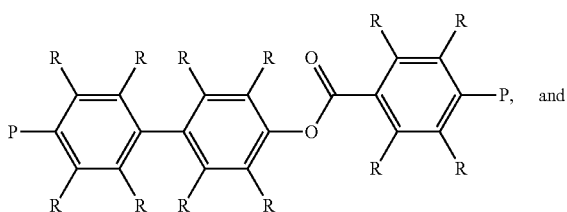

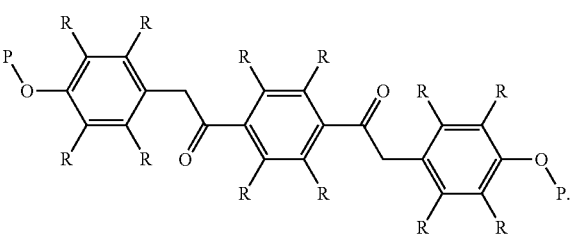

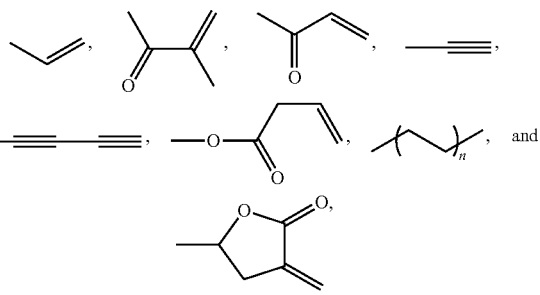

-continued

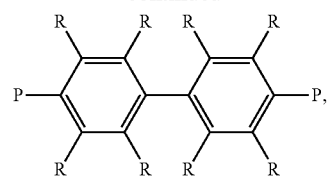

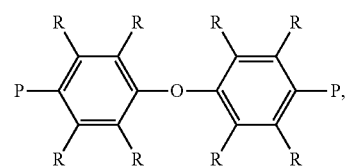

Each of P may be a compound represented by Formula 2.

[Formula 2]

Each of R may independently be one of —Cl, —F, —Br, —I, —H, —NO$_2$, —(CH$_2$)$_n$CH$_3$, or —O—(CH$_2$)$_n$CH$_3$, the reactive mesogen may include two groups of

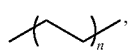

and n may be 0 to 20.

In an exemplary embodiment of the present inventive concept, the reactive mesogens may include a compound represented by Formulae 3 4.

[Formula 3]

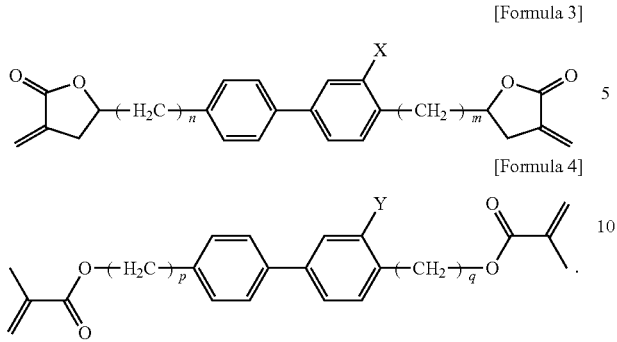

[Formula 4]

In Formulae 3 and 4, each of X and Y may independently represent —F, —H or an alkyl group or an alkoxy group having 1 to 4 carbon atoms, and n may independently be an integer from 0 to 3.

The first main alignment layer MAL1 may include a polymer such as polyimide, polyamic acid, polyamic imide, polyester, polyethylene, polyurethane, or polystyrene, or a mixture thereof.

According to an exemplary embodiment of the present inventive concept, the first main alignment layer MAL1 may be a polymer obtained by polymerizing at least one of the diamines represented by the following Formula 5 and at least one of the dianhydrides represented by the following Formula 6.

[Formula 5]

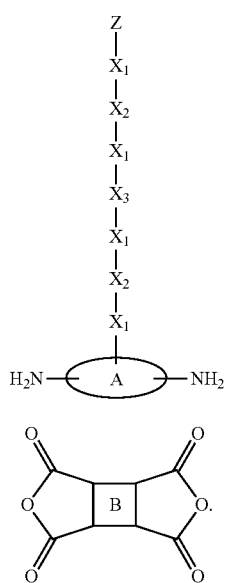

[Formula 6]

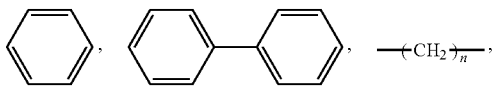

In Formula 5, A may be one of the compounds represented by Formula 7, and the following n may be an integer from 1 to 20. A may be a trivalent group in which two amine groups and $X_1$ may be bonded to optional and replaceable three sites Formula 7.

[Formula 7]

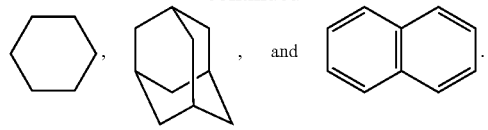

-continued

In Formula 5, $X_1$ may be one of the compounds represented by Formula 8.

[Formula 8]

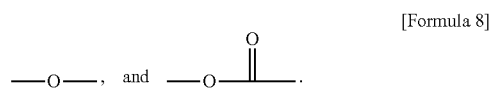

In Formula 5, $X_2$ may be one of the compounds represented by Formula 9.

[Formula 9]

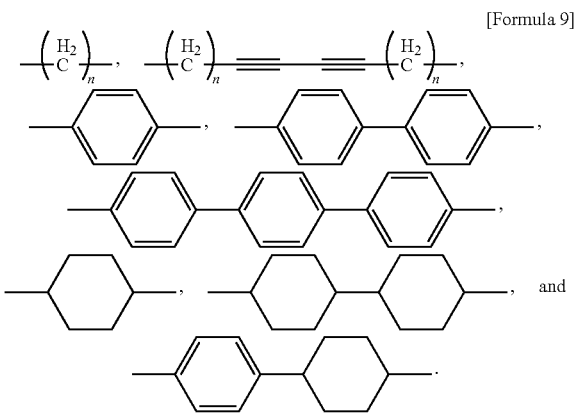

In Formula 5, $X_3$ may be one of the compounds represented by Formula 10. $X_3$ may be a divalent group in which $X_1$ and $X_2$ may be bonded to two optional and replaceable sites in $X_3$.

[Formula 10]

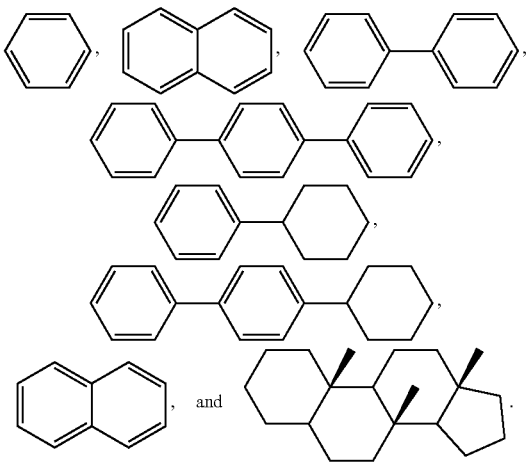

In the above Formula 5, Z may be one of the compounds represented by Formulae 11 and 12. Z may be a monovalent group in which $X_1$ may be bonded to one optional and replaceable site of Z.

[Formula 11]

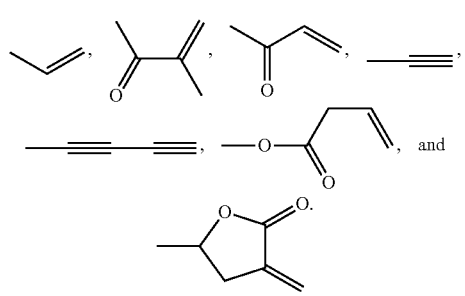

[Formula 12]

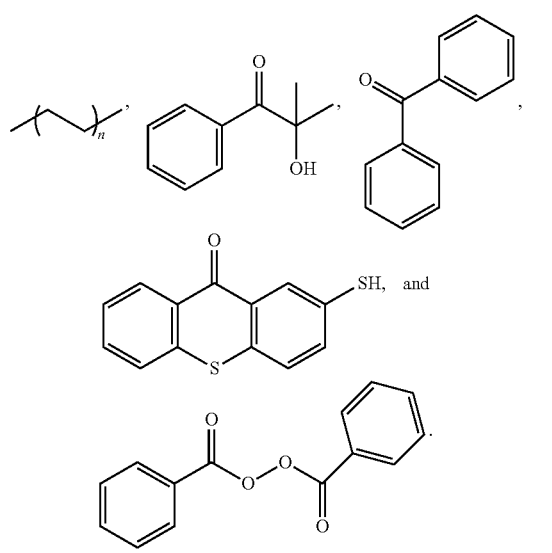

In Formula 6, B may be one of the compounds represented by Formula 13. B may be a tetravalent group, and each of the bridges of the dianhydride bonded to B may be bonded to four optional and replaceable sites of B.

[Formula 13]

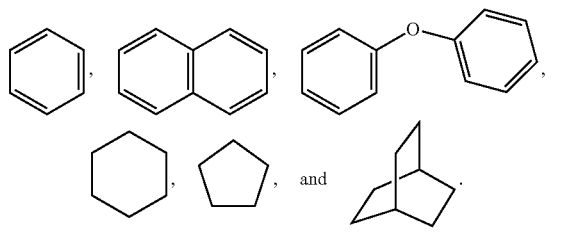

The dianhydride may be at least one of the dianhydrides represented by Formula 14.

[Formula 14]

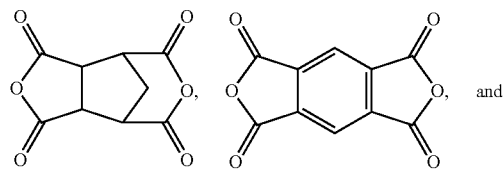

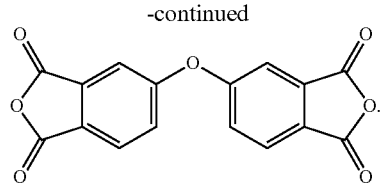

The diamine may be at least one of the diamines represented by Formula 15.

[Formula 15]

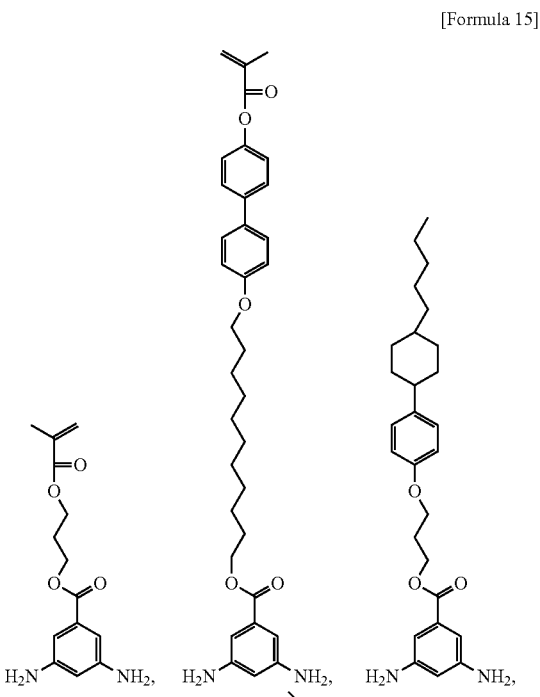

In an exemplary embodiment of the present inventive concept, the first alignment forming layer PTL1 may have a network shape and may be connected to the first main alignment layer MAL1 as a side chain. For convenience of explanation, the first alignment forming layer PTL1 is illustrated as a layer shape including the first main alignment layer MAL1.

The first main alignment layer MAL1 and the first alignment forming layer PTL1 may include a plurality of regions aligned in correspondence to the first to fourth domains DM1, DM2, DM3 and DM4 of the pixel electrode PE. In an exemplary embodiment of the present inventive concept, the first main alignment layer MAL1 and the first alignment forming layer PTL1 may include first to fourth regions, and the liquid crystal molecules LC may be aligned in different directions in the domains DM1, DM2, DM3, and DM4 corresponding to the first to fourth regions.

The second substrate SUB2 may include the second base substrate BS2, and a color filter CF, a black matrix BM, and a common electrode CE may be disposed on the second base substrate BS2. The color filter CF may be disposed on the second base substrate BS2, and may provide colors to the lights penetrating the liquid crystal layer LCL.

The black matrix BM may be disposed in a blocking region of the first substrate SUB1. The blocking region may be defined as a region in which the data line DLm, the thin film transistor Tr, and the gate line GLn are disposed. In the blocking region, the pixel electrode PE might not be disposed, and the liquid crystal molecules LC might not be aligned and light leakage may occur. Thus, the black matrix BM may be disposed in the blocking region to block the light leakage.

The common electrode CE may be disposed on the color filter CF and may generate an electric field with the pixel electrode PE to drive the liquid crystal layer LCL. The common electrode CE may include a transparent conductive material. The common electrode CE may include a conductive metal oxide such as ITO, IZO, or ITZO.

In an exemplary embodiment of the present inventive concept, the color filter CF, the black matrix BM, and the common electrode CE may be disposed on the second substrate SUB2, however exemplary embodiments of the present inventive concept are not limited thereto. In an exemplary embodiment of the present inventive concept, at least one of the color filter CF, the black matrix BM, and the common electrode CE may be disposed on the first substrate SUB1, but not on the second substrate SUB2.

The second alignment layer ALN2 may be disposed on the second substrate SUB2. The second alignment layer ALN2 may include the second main alignment layer MAL2 and the second alignment forming layer PTL2. The second main alignment layer MAL2 may be disposed on the common electrode layer CE. The second alignment forming layer PTL2 may be disposed on the second main alignment layer MAL2. The second main alignment layer MAL and the second alignment forming layer PTL2 may be substantially the same as the first main alignment layer MAL1 and the first alignment forming layer PTL1 except for being formed on the second substrate SUB2. Thus, repeated explanations may be omitted.

Between the first substrate SUB1 and the second substrate SUB2, the liquid crystal layer LCL including the liquid crystal molecules LC may be disposed. The liquid crystal layer LCL may have a negative dielectric anisotropy, however is not limited thereto and may have a positive dielectric anisotropy.

In the liquid crystal display device according to an exemplary embodiment of the present inventive concept, when gate signals are applied to the gate line GLn, the thin film transistor Tr may be turned-on. Data signals applied to the data line DLm may be transmitted to the pixel electrode PE through the thin film transistor Tr. When the thin film transistor Tr is turned-on, and the data signals are transmitted to the pixel electrode PE, an electric field may be generated between the pixel electrode PE and the common electrode CE. The liquid crystal molecules LC may be driven by the electric field generated by the voltage difference applied to the common electrode CE and the pixel electrode PE. The electric field penetrating the liquid crystal layer may be changed and images may be displayed.

A liquid crystal display device according to an exemplary embodiment of the present inventive concept may have various pixel structures. For example, two gate lines GLn and one data line DLm may be connected to one pixel PXL according to an exemplary embodiment of the present inventive concept. One gate line GLn and two data lines GLm may be connected to one pixel PXL according to an exemplary embodiment of the present inventive concept. One pixel PXL may include two sub pixels to which two different voltages are applied. A relatively high voltage may be applied to one sub pixel and a relatively low voltage may be applied to the remaining sub pixel. Elements in the pixel PXL such as a gate electrode GE, a source electrode SE, and a drain electrode DE may be disposed in a structure different from the illustrated structure according to an exemplary embodiment of the present inventive concept.

In the liquid crystal display device according to an exemplary embodiment of the present inventive concept, the shapes of the pixel electrode PE and the common electrode CE may be different from the above-described shapes. For example, the pixel electrode PE may include a plurality of branch parts, however exemplary embodiments of the present inventive concept are not limited thereto. The pixel electrode PE may have other shapes.

Figure 3:
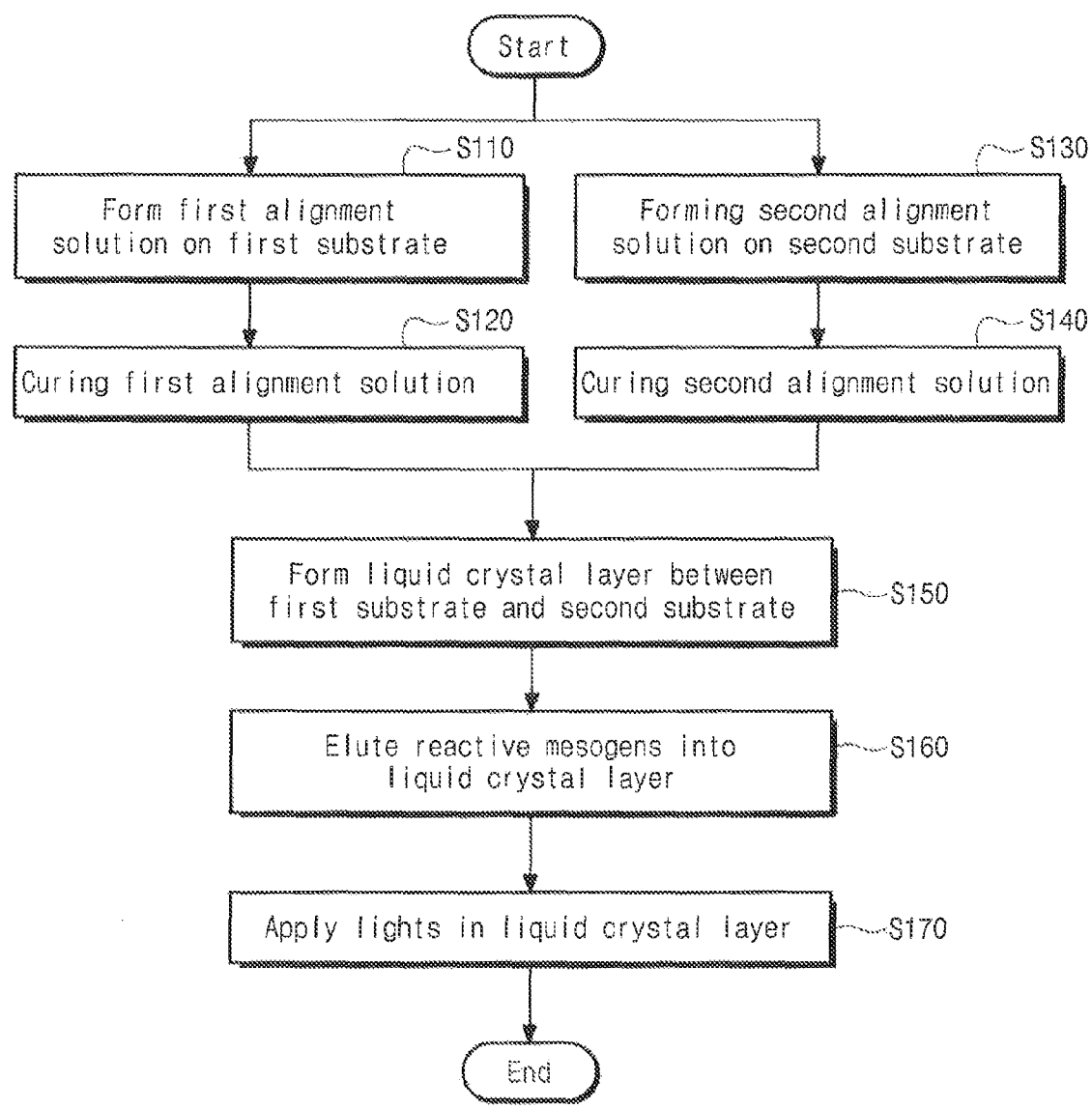
FIG. 3 is a flowchart illustrating a method for manufacturing a liquid crystal display device according to an exemplary embodiment of the present inventive concept.

FIG. 3 is a flowchart illustrating a method for manufacturing a liquid crystal display device according to an exemplary embodiment of the present inventive concept.

Referring to FIG. 3, in manufacturing the liquid crystal display device according to an exemplary embodiment of the present inventive concept, a first alignment solution may be formed on a first substrate (Step S110), and the first alignment solution may be cured to form a first main alignment layer (Step S120). A second alignment solution may be formed on a second substrate (Step S130), and the second alignment solution may be cured to form a second main alignment layer (Step S140). Then, a liquid crystal layer may be formed between the first substrate and the second substrate (Step S150). The liquid crystal layer may be heated to elute reactive mesogens into the liquid crystal layer (Step S160). Subsequently, light may be applied to the liquid crystal layer to react the reactive mesogens to form a first alignment forming layer and a second alignment forming layer (Step S170).

FIGS. 4A, 4B, 4C and 4D are cross-sectional views illustrating a method for forming an alignment layer according to an exemplary embodiment of the present inventive concept. In FIGS. 4A to 4D, constituent elements may be omitted, and the first substrate SUB1 and the second substrate SUB2 may be illustrated as one layer for convenience of explanation. Hereinafter, a method for manufacturing the liquid crystal display device according to an exemplary embodiment of the present inventive concept will be explained in more detail referring to FIGS. 1 to 3, 4A, 4B, 4C and 4D.

First, referring to FIGS. 1 and 2, the step of forming the first substrate SUB1 will be explained in more detail below.

A gate pattern may be formed on the first base substrate BS1. The gate pattern may include the gate line GLn and a storage electrode part. The gate pattern may be formed by a photolithography process.

On the gate pattern, the gate insulating layer GI may be formed.

On the gate insulating layer GI, the semiconductor pattern SM may be formed. The semiconductor pattern SM may include an active pattern and an ohmic contact layer formed on the active pattern. The semiconductor pattern SM may be formed by the photolithography process.

On the semiconductor pattern SM, a data pattern may be formed. The data pattern may include the data line DLm, the source electrode SE, and the drain electrode DE. The data pattern may be formed by a photolithography process. The semiconductor pattern SM and the data pattern may be formed by a half mask or a diffraction mask.

On the data pattern, a passivation layer PSV may be formed. The passivation layer PSV may includes a contact hole CH exposing a portion of the drain electrode DE and may be formed by a photolithography process.

On the passivation layer PSV, the pixel electrode PE connected to the drain electrode DE through the contact hole CH may be formed. The pixel electrode PE may be formed by the photolithography process.

Figure 4A:
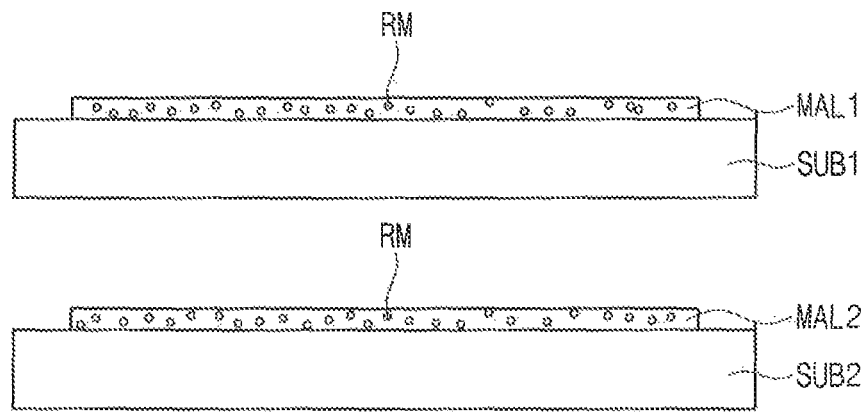
FIGS. 4A, 4B, 4C and 4D are cross-sectional views illustrating a method for forming an alignment layer according to an exemplary embodiment of the present inventive concept.

Referring to FIG. 4A, an alignment solution may be disposed (e.g., coated) on the first substrate SUB1, and the alignment solution may be cured to form the first main alignment layer MAL1.

The alignment solution may include an alignment agent for forming a main alignment layer through polymerization, reactive mesogens RM for forming an alignment forming layer through polymerization, and a solvent.

The solvent is not specifically limited to being mixed with the alignment agent and the reactive mesogens and forming the alignment solution. In an exemplary embodiment of the present inventive concept, the solvent may include γ-butyrolactone (γ-BL), ethylene glycol butyl ether (or butyl cellosolve; BCS), N-methyl pyrrolidone (NMP), or a mixture of two or more of the preceding solvents.

The alignment agent may, for example, be a monomer, a dimer, or an oligomer of the polymer such as polyimide, polyamic acid, polyamide, polyamic imide, polyester, polyethylene, polyurethane, or polystyrene, or a mixture thereof.

In an exemplary embodiment of the present inventive concept, the alignment agent may include at least one of the diamines represented by the above Formula 5 and at least one of the dianhydrides represented by the above Formula 6.

In an exemplary embodiment of the present inventive concept, mole ratios of the diamine and the dianhydride may be one to one for the reaction of the compounds. For example, when the total mole ratio of the diamine and the dianhydride is about 100 mol %, the mole ratios of the dianhydride and the diamine may be about 50 mol % and about 50 mol %, respectively.

In an exemplary embodiment of the present inventive concept, when the mole ratio of the diamine is about 50 mol %, the diamine represented by Formula 11 may be about 10 mol % to about 40 mol %, and the diamine represented by Formula 12 may be about 10 mol % to about 40 mol %. In an exemplary embodiment of the present inventive concept, the diamine represented by Formula 11 may be about 30 mol %, and the diamine represented by Formula 12 may be about 20 mol %. The diamine having the reactive group represented by Formula 11 may be combined with an adjacent reactive group and may contribute to the pre-tilting of the liquid crystal molecules LC. The diamine having the reactive group represented by Formula 12 may contribute to the vertical alignment of the liquid crystal molecules LC.

In an exemplary embodiment of the present inventive concept, the diamine represented by Formula 12 may be about 30 mol %, and a pyridine-based tertiary amine (not shown) may be about 20 mol %. The diamine having the reactive group represented by Formula 12 may contribute to the vertical alignment of the liquid crystal molecules LC, and the pyridine-based tertiary amine may be combined with the adjacent reactive group and may contribute to the pre-tilting of the liquid crystal molecules LC.

The reactive mesogen RM may include at least one of the compounds represented by the above Formula 1. The reactive mesogen RM may be about 0.1 parts by weight to about 15 parts by weight with respect to 100 parts by weight of the alignment agent. In an exemplary embodiment of the present inventive concept, the reactive mesogen RM may be 7 parts by weight with respect to 100 parts by weight of the alignment agent.

In an exemplary embodiment of the present inventive concept, the reactive mesogen RM may include a compound represented by the above Formula 3.

In the alignment solution, a cross-linking agent, and/or an adhesive increasing agent may be included.

The curing step of the alignment solution may include a pre-curing step of the alignment solution at a first temperature, and a main-curing step of the alignment solution at a second temperature which may be higher than the first temperature. The first temperature may be from about 60° C. to about 180° C. The second temperature may be from about 150° C. to about 280° C.

The main-curing step may be conducted for a longer time period than the time period for the pre-curing step. Most of the solvents in the alignment solution may be removed during the pre-curing step, and the polymerization of the diamine and the dianhydride may be mostly completed during the main-curing step. A portion of the diamine having a terminal group represented by the above Formula 11 may react. In an exemplary embodiment of the present inventive concept, the reactive mesogens RM may partially react during the curing step. The reactive mesogens RM may be present in the first main alignment layer MAL1 in an unreacted state.

Referring to FIGS. 1 and 2, the step of forming the second substrate SUB2 will be described in more detail below.

On the second base substrate BS2, the color filter CF for exhibiting colors may be formed. On the color filter CF, the common electrode CE may be formed. The color filter CF and the common electrode CE may have various shapes, and may be formed by a photolithography process.

Figure 4B:
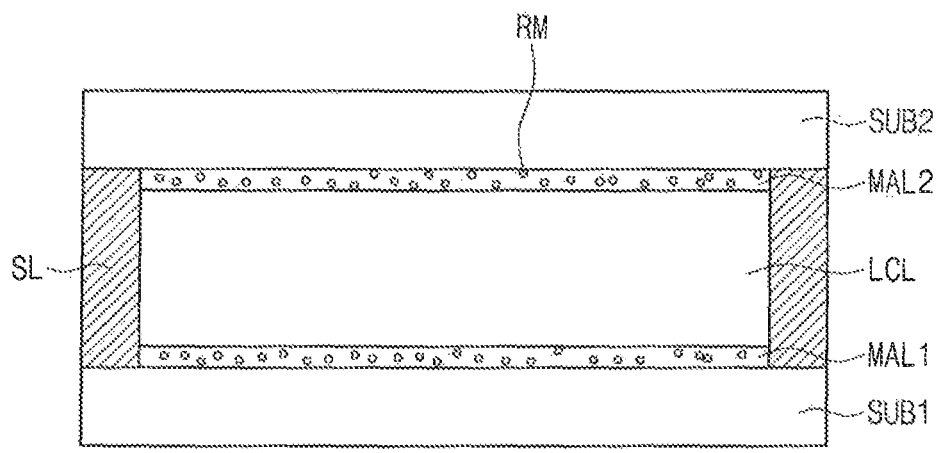

Referring to FIG. 4B, the alignment solution may be formed on the second substrate SUB2, and the alignment solution may be cured to form the second main alignment layer MAL2.

The second main alignment layer MAL2 may be formed by substantially the same method as that for forming the first main alignment layer MAL1 except for being formed on the second substrate SUB2. Thus, repeated explanation may be omitted.

As shown in FIG. 4B, the first substrate SUB1 and the second substrate SUB2 may face each other, and the liquid crystal layer LCL may be formed using a liquid crystal composition between the first substrate SUB1 and the second substrate SUB2.

The liquid crystal layer LCL may be formed between the first and second substrates SUB1 and SUB2 by providing liquid crystals to one of the first and second substrates SUB1 and SUB2, disposing a sealant solution (for example, by coating) along an edge part of the first and second substrates SUB1 and SUB2, facing the first and second substrates SUB1 and SUB2, and curing the sealant solution. The sealant solution may be cured to form a sealant SL.

Figure 4C:
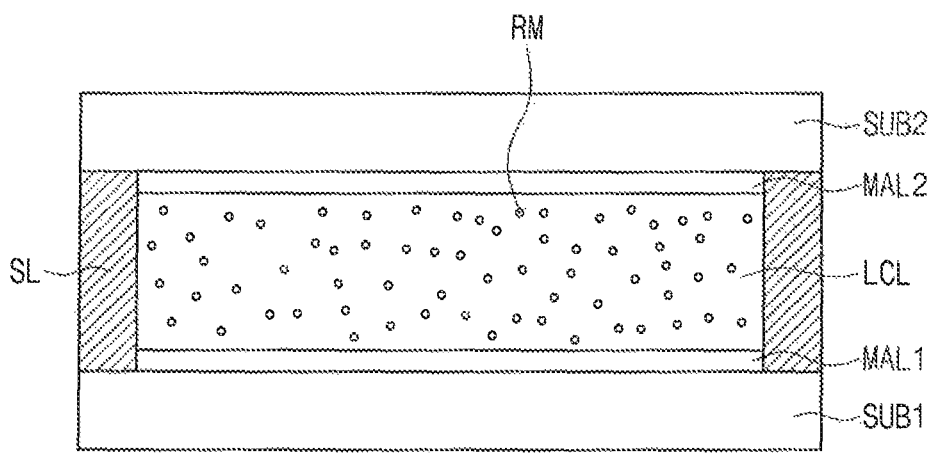
Figure 4D:
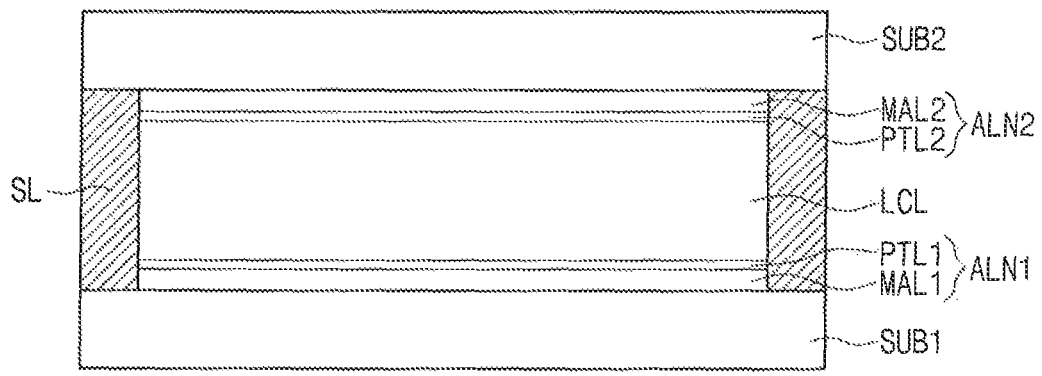

Then, as shown in FIG. 4C, the reactive mesogens RM included in the first main alignment layer MAL1 and the second main alignment layer MAL2 may be eluted into the liquid crystal layer LCL by heating the first and second main alignment layers MAL1 and MAL2 and the liquid crystal layer LCL. The reactive mesogens RM may be diffused into the liquid crystal layer LCL by the heating.

In an exemplary embodiment of the present inventive concept, the heating step of the liquid crystal layer LCL may be the same step as the curing step of the sealant solution. For example, by heating the sealant solution and the liquid crystal layer LCL at substantially the same time, the sealant solution may be cured and the reactive mesogens RM included in the first and second main alignment layers MAL1 and MAL2 may be eluted into the liquid crystal layer LCL. The curing temperature of the sealant solution may be from about 110° C. to about 120° C.

Then, light may be provided to the liquid crystal layer LCL to perform the reaction of the reactive mesogens RM and to form the first alignment forming layer PTL1 on the first main alignment layer MAL1 and to from the second alignment forming layer PTL2 on the second main alignment layer MAL2.

The step of providing the light to the liquid crystal layer LCL to perform the reaction of the reactive mesogens RM may include an electric field exposing step by which the liquid crystal layer LCL is exposed to light while applying the electric field, and a non-electric field exposing step by which the liquid crystal layer LCL is exposed to light after removing the electric field.

The light may include ultraviolet light, infrared red or far infrared light. According to an exemplary embodiment of the present inventive concept, electron beams, or radiation may be applied to the liquid crystal layer LCL, which may generate the reaction of a photo reactive group. In an exemplary embodiment of the present inventive concept, the light may be ultraviolet light. The light may irradiate the first base substrate BS1 in a vertical direction or an inclined direction thereto. The exposing angle and the intensity of the light may be changed according to the driving mode of the liquid crystal display device and the physical properties of the material of the alignment layer. For example, ultraviolet light of about 60 J/cm$^2$ may be provided to the liquid crystal layer LCL for about 40 to about 80 minutes during the electric field exposing step, and ultraviolet light of the same or a different wavelength may be provided to the liquid crystal layer LCL during the non-electric field exposing step with the same or different intensity as that in the electric field exposing step, for the same or a different time period as that in the electric field exposing step.

The reactive mesogens RM may be polymerized through the electric field exposing and the non-electric field exposing step on the first main alignment layer MAL1 and the second main alignment layer MAL2. Thus, the first alignment forming layer PTL1 and the second alignment forming layer PTL2 may be formed.

In the electric field exposing step, the electric field may be formed by applying different voltages to the pixel electrode PE and the common electrode CE, respectively, and may be aligned in the substantially the same direction as the liquid crystal molecules around the reactive mesogens RM. When light is provided to the liquid crystal layer LCL, the reactive mesogens RM may be polymerized to form a network between the reactive mesogens RM. The reactive mesogens RM may form a side chain through the bonding with adjacent reactive mesogens RM. When the reactive mesogens RM form the network while the liquid crystal molecules LC are aligned, the network may have certain directional properties according to the average alignment direction of the liquid crystal molecules LC. Thus, the liquid crystal molecules LC adjacent to the network may have a pre-tilt angle after eliminating the electric field.

In the non-electric field exposing step, the reaction between unreacted sites of the first and second alignment forming layers PTL1 and PTL2 and the unreacted reactive mesogens RM may be completed. The first and the second alignment forming layers PTL1 and PTL2 may be stabilized.

In the liquid crystal display device manufactured by the above-described method, liquid crystal molecules LC may be pre-tilted, and black afterimage and surface afterimage may be reduced. Hereinafter, an exemplary embodiment of the present inventive concept will be explained through a Comparative Example and Examples 1 and 2.

In the following Table 1, alignment components (solid content) of each alignment solution may be illustrated when manufacturing the liquid crystal display device using different alignment compositions.

TABLE 1

| | Blending ratio (wt/wt %) | Dianhydride (mole ratio) | Diamine (mole ratio) | | | Reactive mesogen (amount based on alignment agent) |
|---|---|---|---|---|---|---|
| | | | First diamine | Second diamine | Other diamine | |
| Comparative Example | — | | A + B (50%) | D (30%) | E2 (20%) | |
| Example 1 | — | | A + B (50%) | D (30%) | E2 (20%) | G (7 wt %) |
| Example 2 | Upper layer (10%) | | A + B (50%) | D (30%) | E2 (20%) | G (7 wt %) |
| | Lower layer (90%) | | A + B (50%) | E1 (30%) | F (20%) | |

In the Comparative Example, the alignment layer may be formed by a common method. In the liquid crystal display device according to the Comparative Example, the alignment solution may have substantially the same component ratio as that in Example 1 while excluding reactive mesogens. In Examples 1 and 2, alignment layers may be formed by means of a method including the reactive mesogens according to exemplary embodiments of the present inventive concept.

In the Comparative example 1, Example 1 and Example 2 in the above Table 1, the dianhydride and the diamine may be 7 wt %, and 63 wt % of N-methyl pyrrolidone and 30 wt % of butyl cellosolve may be included as solvents with respect to 100 wt % of the total amount of the alignment solution. The reactive mesogens may be added only in the alignment solutions of Example 1 and Example 2, and may be 7 wt % with respect to 100 wt % of the amount of dianhydride and the diamine.

In the liquid crystal display device according to Example 1, the alignment layer may be a single layer, and in the liquid crystal display device according to Example 2, the alignment layer may be a double layer formed by micro-phase separation.

In the above Table 1, all conditions may be the same except for the composition of the alignment solution in the Comparative Example, Example 1 and Example 2. The liquid crystal display device may be manufactured by the curing step of the sealant in the Comparative Example, Example 1 and Example 2, and any additional step might not be performed for the elution of the reactive mesogens into the liquid crystal layer in Examples 1 and 2.

The liquid crystal display devices according to the Comparative Example, Example 1 and Example 2 may be manufactured to have a structure shown in FIG. 1.

In the above Table 1, A, B and C may have the structures of the following Formulae 16 to 18 in order. D may have the structure of the following Formula 19, and E1 and E2 may have the following Formulae 20 and 21 in order. F may be a pyridine-based tertiary amine, and G may have the structure of Formula 22. D may be selected so that the total amount of two diamines of Formula 19 are 30 mol %.

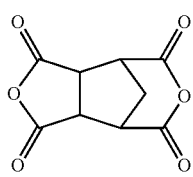

[Formula 16]

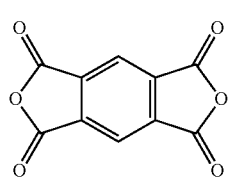

[Formula 17]

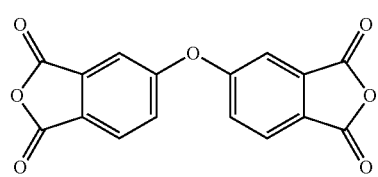

[Formula 18]

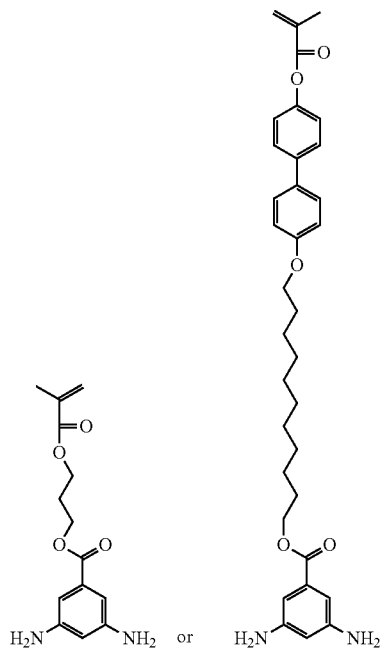

[Formula 19]

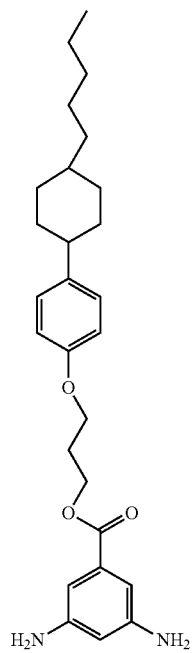

[Formula 20]

-continued

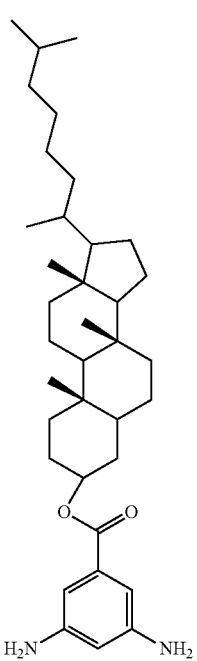
[Formula 21]

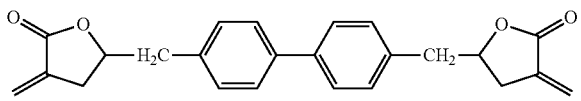
[Formula 22]

In an exemplary embodiment of the present inventive concept, after the alignment solution is cured to become the main alignment layer, the reactive mesogens included in the alignment solution may remain in the main alignment layer and may be eluted into the liquid crystal layer with the application of heat energy. In the above Example 1 and Example 2, the elution amounts of the reactive mesogens into the liquid crystal layer after the curing of the sealant are illustrated in the following Table 2.

TABLE 2

| | Amount ratio in liquid crystal layer (relative value: wt %) | |
| --- | --- | --- |
| | Before curing sealant | After curing sealant |
| Example 1 | 0.02 | 0.42 |
| Example 2 | 0.01 | 0.40 |

As shown in the above Table 2, the reactive mesogens may be eluted into the liquid crystal layer during heating the cured main alignment layer at the sealant curing step.

Table 3 illustrates the afterimage in the liquid crystal display devices according to the Comparative example 1, Example 1 and Example 2.

TABLE 3

| | Comparative Example | Example 1 | Example 2 |
| --- | --- | --- | --- |
| Reactive mesogens | Not added | Added | Added |
| Main curing temperature (Celsius) | 200° C. | 200° C. | 200° C. |
| Non-electric field exposing step | Used | Used | Used |
| Pretilt angle (°) | 89.2 | 88.7 | 88.6 |
| Black afterimage (24 hr) | 2 | 1.5 | 1.2 |
| Surface afterimage (Gray level) | 181 | 157 | 158 |
| Instant afterimage (8 G/64 G) | 30 sec | 12 sec | 13 sec |

According to Table 3, the pretilting of liquid crystal molecules may be obtained and controlled during the manufacture of the liquid crystal display device according to an exemplary embodiment of the present inventive concept, and the occurrence of black afterimage, surface afterimage, and instant afterimage may be reduced.

While exemplary embodiments of the present inventive concept have been particularly shown and described with reference to the accompanying drawings, it will be understood by those of ordinary skill in the art that various changes in form and detail may be made therein without departing from the spirit and scope of the present inventive concept as defined by the following claims.

What is claimed is:

1. A method for manufacturing a liquid crystal display device, comprising:
    disposing an alignment solution comprising an alignment agent, reactive mesogens and a solvent on at least one of a first substrate, or a second substrate;
    curing the alignment solution to form a cured main alignment layer;
    disposing a liquid crystal layer between the first substrate and the second substrate;
    heating the cured main alignment layer and the liquid crystal layer and eluting the reactive mesogens from the cured main alignment layer, and diffusing the reactive mesogens into the liquid crystal layer; and
    exposing the liquid crystal layer to light to react the reactive mesogens.

2. The method of claim 1, wherein the reactive mesogens include at least one compound represented by Formula 1:

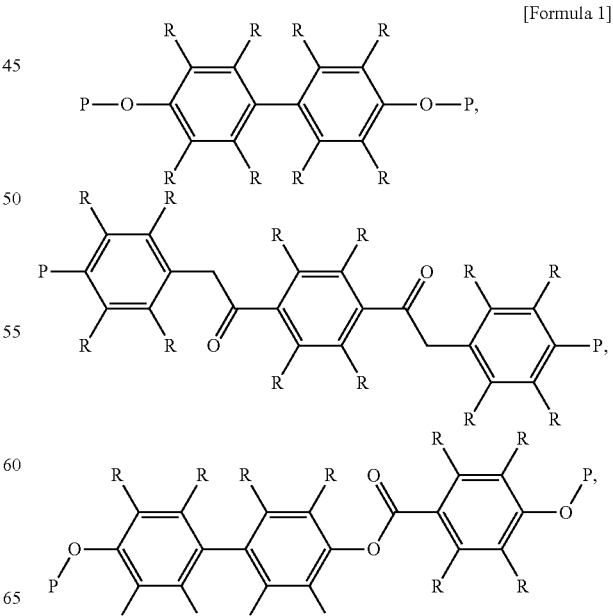
[Formula 1]

-continued

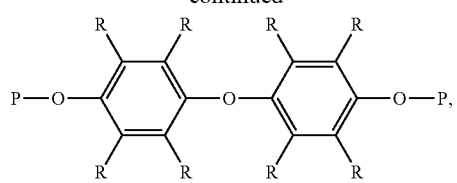

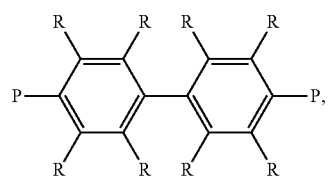

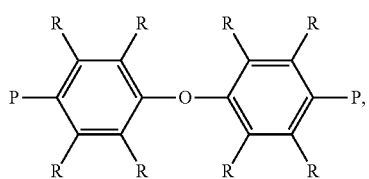

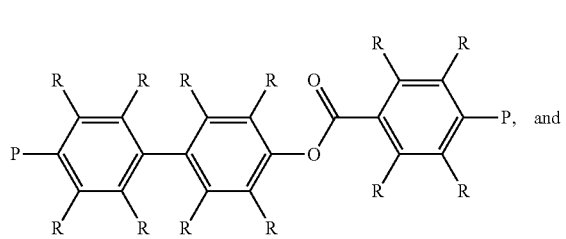

wherein each of P is a compound represented by Formula 2,

[Formula 2]

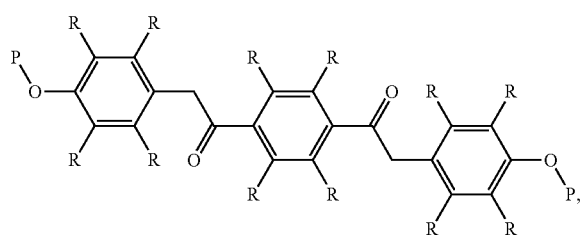

wherein each of R is —Cl, —F, —Br, —I, —H, —NO$_2$, —(CH$_2$)—CH$_3$, or —O—(CH$_2$)$_n$CH$_3$, wherein when one P compound is

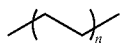

at least one other P compound is not

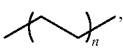

and wherein n is an integer from 0 to 20.

3. The method of claim 2, wherein the reactive mesogens are about 0.1 parts by weight to about 10 parts by weight based on 100 parts by weight of the alignment agent.

4. The method of claim 2, wherein the reactive mesogens are a compound represented by Formula 3 or Formula 4:

[Formula 3]

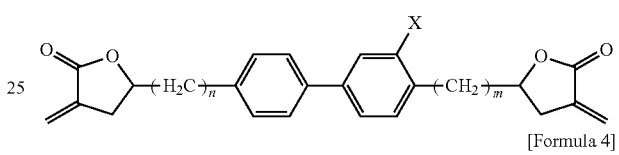

[Formula 4]

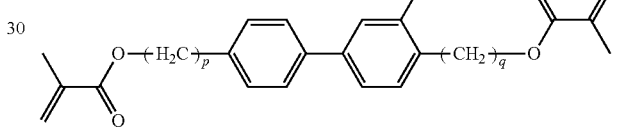

wherein each of X and Y are —F, —H, an alkyl group or an alkoxy group having 1 to 4 carbon atoms, and wherein n, m, p, and q are each an integer from 0 to 3.

5. The method of claim 1, wherein disposing of the liquid crystal layer between the first substrate and the second substrate comprises:

disposing liquid crystals on at least one of the first substrate and the second substrate;

disposing a sealant solution along an edge of at least one of the first substrate and the second substrate;

disposing the first substrate and the second substrate to face to each other with the liquid crystals therebetween; and curing the sealant solution.

6. The method of claim 5, wherein eluting the reactive mesogens into the liquid crystal layer and curing the sealant solution are performed in a single step.

7. The method of claim 1, wherein curing the alignment solution comprises:

pre-curing the alignment solution at a first temperature; and main-curing the alignment solution at a second temperature higher than the first temperature.

8. The method of claim 7, wherein the alignment agent comprises at least one diamine represented by Formula 5 and at least one dianhydride represented by Formula 6:

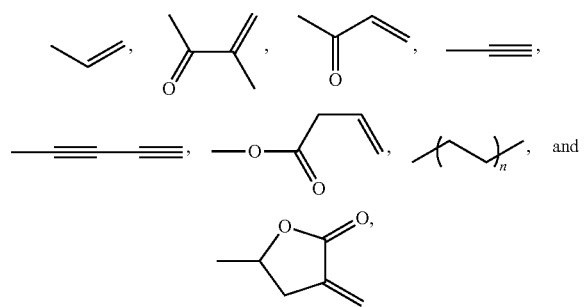

[Formula 5]
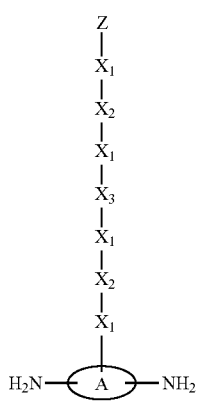
[Formula 6]
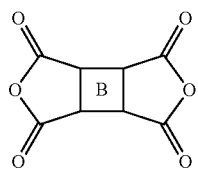
wherein A is a compound represented by Formula 7, and n is an integer from 1 to 20,
[Formula 7]
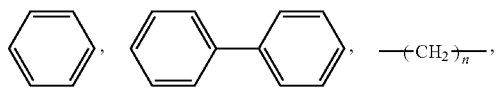
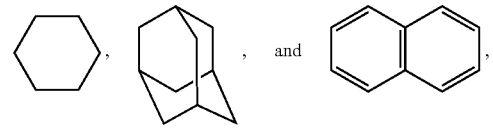
wherein $X_1$ is a compound represented by Formula 8,
[Formula 8]
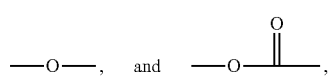
wherein $X_2$ is a compound represented by Formula 9,
[Formula 9]
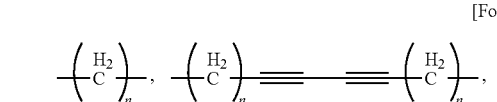
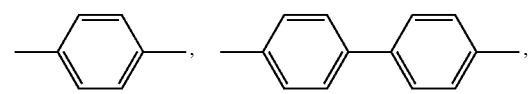
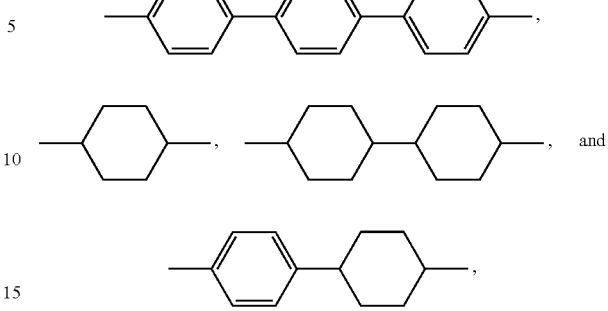
wherein $X_3$ is a compound represented by Formula 10,
[Formula 10]
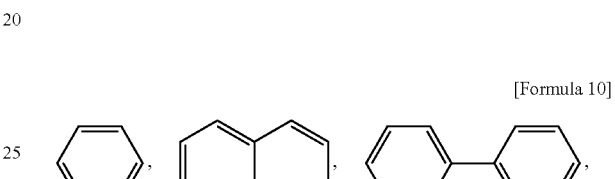
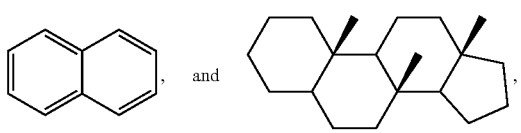
wherein Z is a compound represented by Formulae 11 or 12,
[Formula 11]
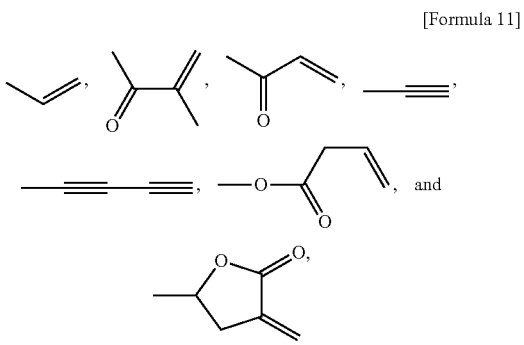

[Formula 12]

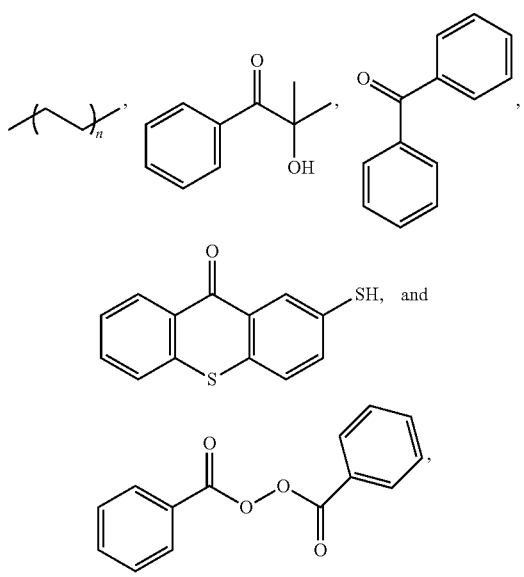

and wherein B is a compound represented by Formula 13,

[Formula 13]

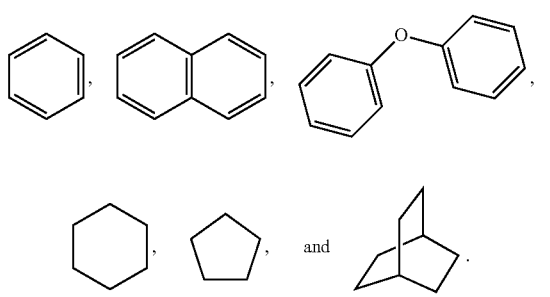

9. The method of claim 8, wherein the dianhydride is at least one dianhydride represented by Formula 14:

[Formula 14]

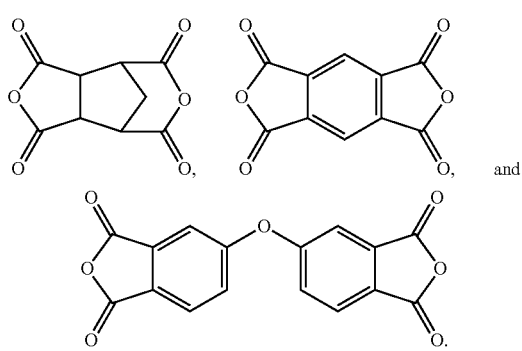

10. The method of claim 7, wherein the alignment agent comprises at least one diamine represented by Formula 15:

[Formula 15]

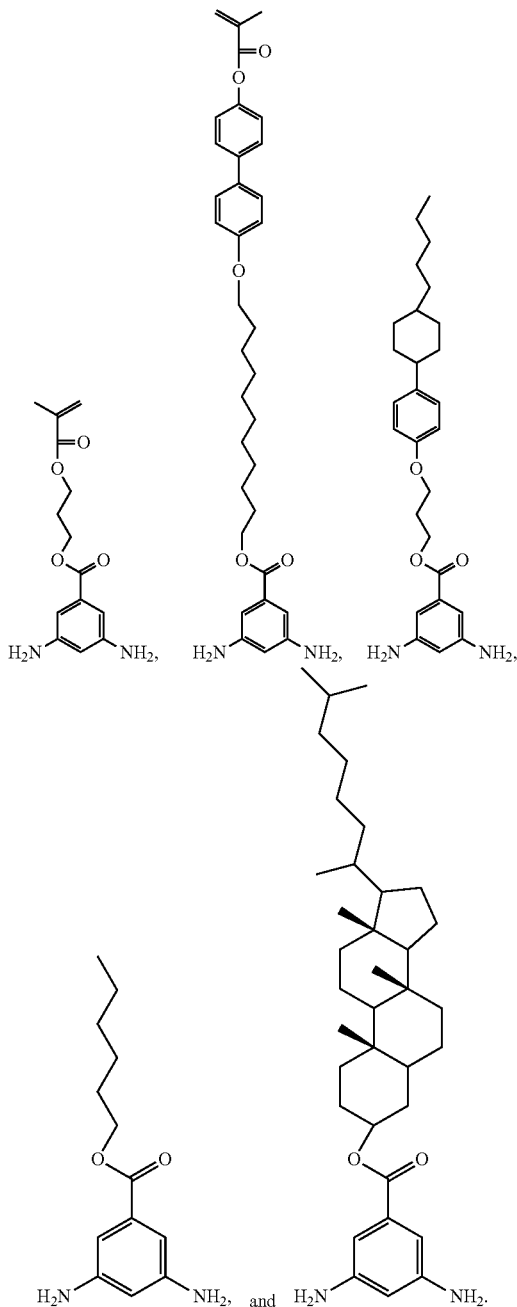

11. The method of claim 1, further comprising applying an electric field to the liquid crystal layer,
wherein exposing the liquid crystal layer to light and applying the electric field to the liquid crystal layer are performed at the same time.

12. The method of claim 11, further comprising forming a pixel electrode on the first substrate and forming a common electrode on the second substrate,
wherein the electric field is formed between the pixel electrode and the common electrode.

13. The method of claim 12, wherein the pixel electrode comprises a stem part and a plurality of branch parts extruded and extended from the stem part.

14. The method of claim 13, wherein the first substrate comprises a plurality of pixel regions having a plurality of domains, and wherein the branch parts extend in different directions from each other in correspondence to each of the domains.

15. A method of forming an alignment layer of a liquid crystal display, comprising:
forming a first alignment solution comprising reactive mesogens on a first substrate;
curing the first alignment solution;
forming a second alignment solution comprising reactive mesogens on a second substrate;
curing the second alignment solution;
forming a liquid crystal layer between the first substrate and the second substrate;
heating the first and second cured alignment solutions and eluting the reactive mesogens from the first and second cured alignment solutions into the liquid crystal layer; and
exposing the liquid crystal layer to light to activate a chemical reaction in the reactive mesogens.

16. The method of claim 15, wherein the reactive mesogens are a compound represented by Formula 3 or Formula 4:

[Formula 3]

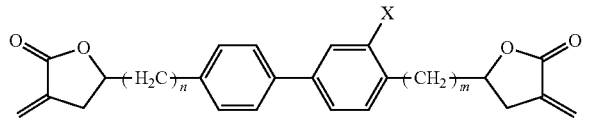

[Formula 4]

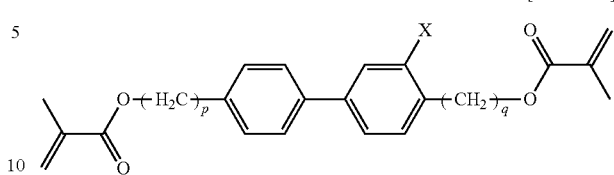

wherein each of X and Y are —F, —H, an alkyl group or an alkoxy group having 1 to 4 carbon atoms, and n, m, p, and q are each an integer from 0 to 3.

17. The method of claim 15, further comprising forming sealant layers between the first substrate and the second substrate along edges of the first and second substrate, wherein the liquid crystal layer is disposed between the sealant layers.

18. The method of claim 15, further comprising applying an electric field to the liquid crystal layer to activate the chemical reaction in the reactive mesogens.

19. The method of claim 15, wherein curing the first and second alignment solutions comprising pre-curing the alignment solution at a first temperature and main-curing the alignment solution at a second temperature.

\* \* \* \* \*